United States Patent [19]
Shahaf et al.

[11] Patent Number: 5,309,159
[45] Date of Patent: May 3, 1994

[54] METHOD AND SYSTEM FOR MOVING OBJECT DETECTION

[75] Inventors: Nahum Shahaf, Ramat Gan; Moshe Meidan, Ramat Hasharon, both of Israel

[73] Assignee: Israel Aircraft Industries Ltd., Lod, Israel

[21] Appl. No.: 838,363

[22] Filed: Feb. 19, 1992

[30] Foreign Application Priority Data

Feb. 19, 1991 [IL] Israel .......................... 97290

[51] Int. Cl.⁵ .............................................. G01S 13/66
[52] U.S. Cl. ........................................ 342/90; 342/95; 342/53; 342/179
[58] Field of Search ............... 342/90, 94, 95, 96, 342/97, 53, 56, 176, 179, 197

[56] References Cited

U.S. PATENT DOCUMENTS

| | | | |
|---|---|---|---|
| 4,275,396 | 6/1981 | Jacomini | 342/93 |
| 4,540,985 | 9/1985 | Clancy et al. | 342/90 |
| 4,587,523 | 5/1986 | Shupe | 342/95 |
| 4,720,711 | 1/1988 | Quesinberry et al. | 342/96 |
| 4,794,395 | 12/1988 | Cindrich et al. | 342/424 |
| 4,851,850 | 7/1989 | Milan et al. | 342/90 |
| 4,972,193 | 11/1990 | Rice | 342/90 |
| 5,068,664 | 11/1991 | Appriou et al. | 342/90 |
| 5,075,694 | 12/1991 | Donnangelo et al. | 342/455 |
| 5,087,916 | 2/1992 | Metzdorff et al. | 342/64 |
| 5,128,684 | 7/1992 | Brown | 342/189 |
| 5,130,715 | 7/1992 | Yanagisawa | 342/158 |

OTHER PUBLICATIONS

Samuel S. Blackman, "Multiple-Target Tracking with Radar Applications", Artech House Inc., Dedham, Mass., 1986.

*Primary Examiner*—John B. Sotomayor
*Attorney, Agent, or Firm*—Ladas & Parry

[57] ABSTRACT

A method of and a system for scanning a scene for the purpose of classifying a plurality of moving objects located in the scene and having an average distance between them, including the steps of performing a sweep of the scene, during the sweep, producing a multiplicity of detections of at least one portion of the scene at a rate such that a distance traveled by the moving objects between detections is small with respect to the average distance, and calculating, from the multiple detections, two-dimensional motion information for at least some of the moving objects.

15 Claims, 5 Drawing Sheets

METHOD AND SYSTEM FOR MOVING OBJECT DETECTION

FIELD OF THE INVENTION

The present invention relates to classification of objects generally and to the classification of objects in a wide field of view, in particular.

BACKGROUND OF THE INVENTION

Various methods for classifying objects in a field of view are known in the art. Typically, a sensor system of some kind, such as a CCD detector and its related optics or a night-vision system, will sweep through a wide Field Of View (FOV) while continuously scanning it. An individual Field Of Regard (FOR) will be scanned once per rotation, or sweep, where an individual FOR is the scene which is detectable by the sensor system at a given instant. The result of scanning an individual FOR, at a given time, produces positional measurements regarding the objects in the FOR.

Any stationary object in an individual FOR can easily be classified since it will appear in the same location in each scan of that FOR. Moving objects, however, are more difficult to classify since their locations in the FOR change between scans of the FOR. In addition, when there are a number of moving objects in the FOR, it is a non-trivial problem to define which of the measurements belong to one moving object and which belong to another. This ambiguity arises because the time between scans of an FOR, known as the revisit time, is typically long compared to the rate of movement of the objects.

One solution is to increase the sweep rate in order to decrease the revisit time. Unfortunately, a fast sweep rate typically produces low signal to noise ratios (SNR) and can smear the measurements. This produces an unacceptably high level of measurements which do not belong to a true moving object; such measurements are known as false measurements, or false alarms. Additionally, for some of the scans of the individual FOR, there will be no measurement of the moving object, even though the object was present, due to the fast sweep rate. This causes a reduction of the probability of detection of moving objects.

Classification and tracking of multiple targets is known in the art as Multiple Target Tracking (MTT) and it has a number of applications, both military and non-military. The military applications include sophisticated weapon delivery systems and satellite surveillance and the non-military applications include air-traffic control. MTT is described, for example, in the book *Multiple-Target Tracking with Radar Applications* by Samuel S. Blackman, published by Artech House, Inc. Dedham, Ma., 1986.

SUMMARY OF THE INVENTION

It is an object of the present invention to provide a system and a method for classifying moving objects by sensing a scene a multiplicity of times and by combining the position information from the multiple detections into motion information.

There is therefore provided, in accordance with a preferred embodiment of the present invention, a method of scanning a scene for the purpose of classifying a plurality of moving objects located in the scene and having an average distance between them. The method includes the steps of performing a sweep of the scene, during the sweep, producing a multiplicity of detections of at least one portion of the scene at a rate such that a distance traveled by the moving objects between detections is small with respect to the average distance and calculating, from the multiple detections, two-dimensional motion information for at least some of the moving objects.

Furthermore, in accordance with a preferred embodiment of the present invention, the step of calculating includes the step of producing a velocity vector generally for each moving object.

Additionally, in accordance with a preferred embodiment of the present invention, the steps of performing, producing and calculating are repeated a plurality of times. The method also includes the step of predicting from first velocity vectors of a first sweep the expected locations of second velocity vectors of a second sweep consecutive with the first sweep.

Furthermore, in accordance with a preferred embodiment of the present invention, there is included a step of matching the first velocity vectors of the first sweep to the second velocity vectors of the second sweep.

Moreover, in accordance with a preferred embodiment of the present invention, the step of matching includes the step of producing forward gates corresponding to the first velocity vectors. Backward gates, corresponding to the second velocity vectors, can also be produced.

Additionally, in accordance with a preferred embodiment of the present invention, the step of matching includes the step of defining a match if a second velocity vector is in a forward gate of a first velocity vector and the first velocity vector is in a backward gate of the second velocity vector. The step of matching is performed after the step of producing a velocity vector is performed.

Furthermore, in accordance with a preferred embodiment of the present invention, the step of performing a sweep is performed in a stepped manner.

There is further provided, in accordance with a preferred embodiment of the present invention, a system for scanning a scene for the purpose of classifying a plurality of moving objects located therein, the system including a sensor system for scanning at least a portion of the scene, motor apparatus for sweeping the sensor system through the scene, sensor operating apparatus for producing a multiplicity of detections of at least one portion of the scene at a rate such that a distance traveled by the moving objects between detections is small with respect to the average distance and processor apparatus for producing, from the multiple detections, two-dimensional motion information for at least some of the moving objects.

Additionally, in accordance with a preferred embodiment of the present invention, the sensor operating apparatus first indicate to the sensor system to scan a first portion of the scene a multiplicity of times and later move the sensor system to aim towards a second different portion of the scene.

Moreover, in accordance with a preferred embodiment of the present invention, the sensor system is one of the following group: night vision systems, vidicon cameras or CCD cameras. Alternatively, the sensor system can be a FLIR system which preferably includes means for internal scanning.

Finally, in accordance with a preferred embodiment of the present invention, the motor apparatus operates in a stepped manner.

BRIEF DESCRIPTION OF THE DRAWINGS

The present invention will be understood and appreciated from the following detailed description, taken in conjunction with the drawings in which.

DETAILED DECRIPTION OF A PREFERRED EMBODIMENT

Figure 1:
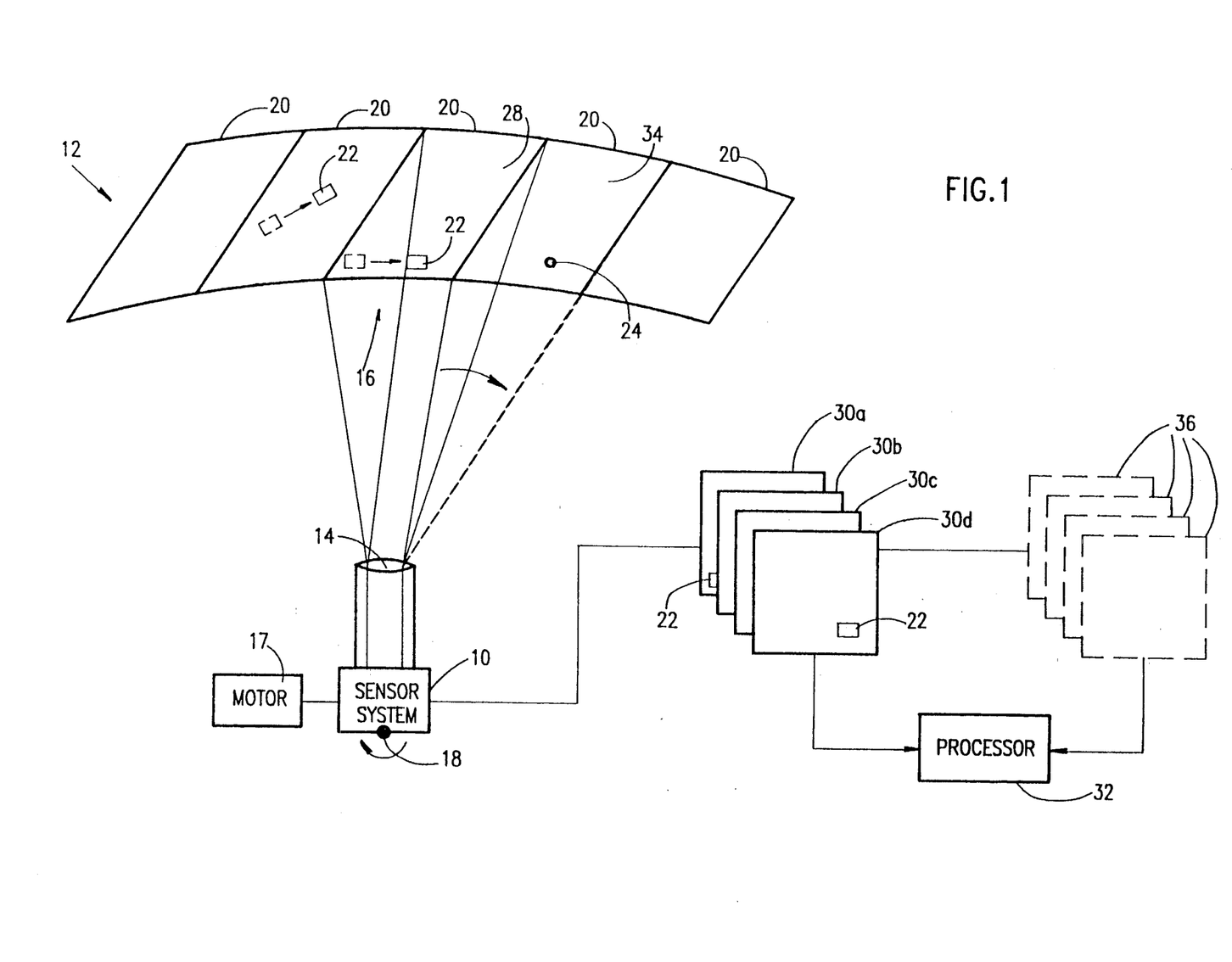
FIG. 1 is a part-pictorial, part block diagram illustration of a system for classifying moving objects in a scene, constructed and operative in accordance with a preferred embodiment of the present invention.

Reference is now made to FIG. 1 which illustrates the system of the present invention. The system comprises a sensor system 10 for detecting objects moving within an area 12 to be scanned and an optical system 14, typically comprising at least one lens, for focussing light onto sensor system 10 and for defining a Field of Regard (FOR) 16 which sensor system 10 can detect at any given moment. Area 12 can be an area forming part or all of the perimeter of a circle. Sensor system 10 is typically rotated, via a motor system 17, around an axis 18 which forms the center of the area 12.

The sensor system 10 can be any kind of positional or directional sensor system which is typically utilized to scan area 12 in a periodic manner. Example sensor systems are Forward Looking InfraRed (FLIR) systems, night vision systems, vidicon or Charge-Coupled Device (CCD) cameras. Other sensor systems include X-ray or gamma-ray sensors or positional sound sensors. The FOR generally is a rectangular Field of View (FOV).

Area 12 is typically divided into a multiplicity of scanning areas 20 of the size of FOR 16. The scanning areas 20 can be adjacent one another, as shown in FIG. 1, or they can be spread apart from one another.

Area 12 is typically scanned for the purpose of detecting and classifying moving and stationary objects, 22 and 24, respectively. Depending on the application, objects 22 and 24 might be cars, ships, airplanes or any other object whose movement it is desired to track.

To scan area 12, motor system 17 typically maintains sensor system 10 in a given position long enough so that sensor system 10 can "stare" at one scanning area 20. Thus, motor system 17 is typically any appropriate motor system which can operate in a stepped fashion, such as a stepping motor.

In FIG. 1, sensor system 10 is shown staring at a scanning area labelled 28. During the staring time, sensor system 10 at a fast rate repeatedly detects area 28, thereby to produce a multiplicity of measurements 30 of the area 28. In accordance with the present invention, the rate of detection is quite fast relative to the average expected speed of the moving objects 22.

The measurements 30 of area 28 are typically images and they and their time of measurement, are stored in a processor 32, such as a personal computer. The measurements are processed, typically using image processing circuitry, such as the VS100 manufactured by Imaging Technology Inc. of Woburn, Mass. of the USA, to produce two-dimensional object location coordinate information, called a detection.

Since the object 22 in the scanned area 28 is moving, its location in scanning area 28 varies. For example, in a measurement 30a, a first measurement, the object 22 is in a first location in the lower left of the image. By a last measurement, 30d, the object 22 has moved to a location to the bottom right of the image. The detections of object 22 are typically the coordinates of the locations of the center of object 22.

At the end of the staring time, motor system 17 rotates sensor system 10 around axis 18 to a new scanned area 34, which, for example, is shown to be adjacent to scanned area 28. Sensor system 10 now produces a set of measurements, labelled 36, of scanned area 34. Measurements 36 and their time of measurement are also stored in processor 32.

In this manner, sensor system 10 scans the entire area 12. After a pre-determined revisit time which is typically longer than in the prior art, sensor system 10 will return to scanned area 28 and rescan it in the manner described hereinabove. In accordance with the present invention and as described in detail hereinbelow, information culled from the first scan indicates to the system generally to where the moving objects have moved in the scanned area 28 during the time that the sensor system 10 was not detecting area 28.

Figure 2A:
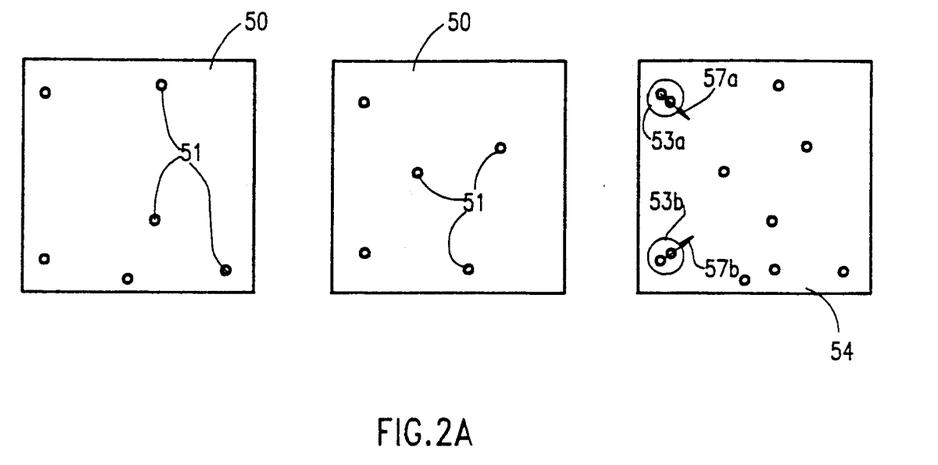
FIGS. 2A and 2B are illustrations of measurements produced by the system of FIG. 1 upon viewing an identical scene during two consecutive time periods and includes the combination of the measurements into two composite images.
Figure 2B:
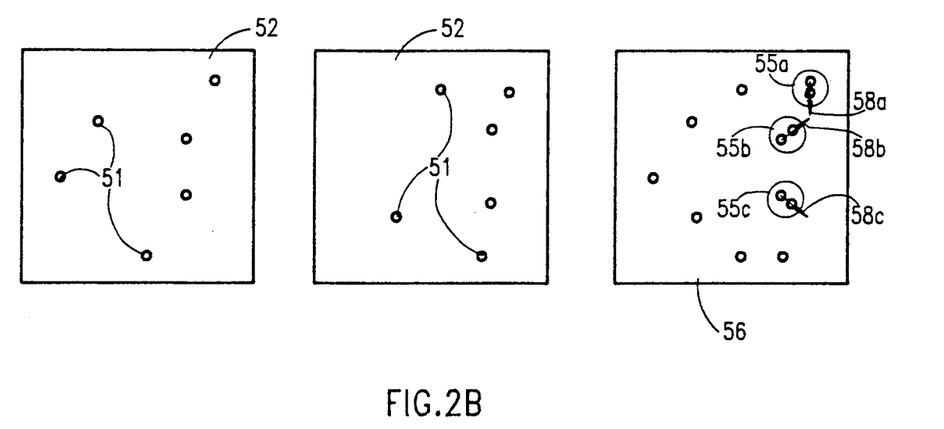

Reference is now made to FIGS. 2A and 2B which illustrate a multiplicity of measurements 50 and 52 produced during two successive staring times of some scanned area 20. Shown are two measurements 50 and two measurements 52. It will be appreciated that two measurements per staring time are a minimum.

Included in the measurements 50 and 52 are a plurality of detections 51, shown as dots, of which some of the detections are received from a moving object and some of the detections are false detections which arise due to noise. As is known in the art, it is not possible to identify which detections 51 are true and which are false just by looking at one of measurements 50 or 52.

In accordance with a preferred embodiment of the present invention, the measurements of a given staring time are combined together into a combination measurement. Thus, measurements 50 are combined together to produce combination measurement 54 and measurements 52 are combined together to produce combination measurement 56.

Because the measurements of a given staring time are produced close in time, any moving object will have moved a very small amount between measurements. Thus, in the combination measurements 54 and 56, the detections 51 of a true moving object will be very close to each other. For example, the detections labelled 53a and 53b in combination measurement 54 are most probably detections of two moving objects and the detections 55a, 55b and 55c in combination measurement 56 are most probably detections of three moving objects.

The false detections, on the other hand, will be randomly scattered about and the probability is small that two false detections from two successive measurements will be close enough to be identified as a moving object.

Detections 53 and 55 are identified through standard MTT correlation techniques. These and other standard MTT techniques are described in detail in the book *Multiple-Target Tracking with Radar Applications* by Samuel S. Blackman, published by Artech House, Inc. Dedham, Ma., 1986, which book is incorporated herein by reference.

Specifically, for each detection 51 of a first measurement 50, a gate is defined within which a detection 51 from the second measurement 50 must be found. If a detection 51 is found within the gate, the detection is considered to be from the same moving object. A similar operation occurs with the measurements 52.

Because the time between the multiplicity of measurements 50 and between the multiplicity of measurements 52 is small, the gate used is small relative to gates used in the prior art, and therefore, the probability that two false measurements will be identified as a moving object is small. It will be noted that the probability of identifying false measurements as moving objects decreases greatly with an increasing number of measurements per starting time.

Once detections 53 and 55 have been identified, the remaining detections, which are now defined as false, are ignored for the rest of the calculations.

Each of detections 53a, 53b, 55a, 55b and 55c define a velocity vector, labelled arrows 57a, 57b, 58a, 58b and 58c, indicating the direction and speed of movement of the moving object. Velocity vectors 57 and 58 give information regarding the probable position of the moving object at the next staring time, as well as at the previous staring time, and thus, narrow, over the prior art, the gate, or window, necessary for identifying the next location of the moving object. For this reason, the velocity vectors 57 and 58 form the basis elements for the calculations of the present invention.

The fact that a velocity vector can be defined is not enough to classify moving objects. Typically, it is desired to know the movement of the moving objects over a long period of time and to classify that the objects seen at a later time are, in fact, the same as the objects seen at an earlier time. Thus, for example, it is necessary to classify that detection 55c is a later detection of the same object that traced detection 53a.

Velocity vectors 57 are utilized to predict the next location of the moving object. To this end, a gate is opened, according to standard MTT techniques, using the velocity vectors 57 and known measurement and position detection errors. This can be understood by considering a superposition 60, shown in FIG. 3 to which reference is now made, of combination measurements 54 and 56.

Figure 3:
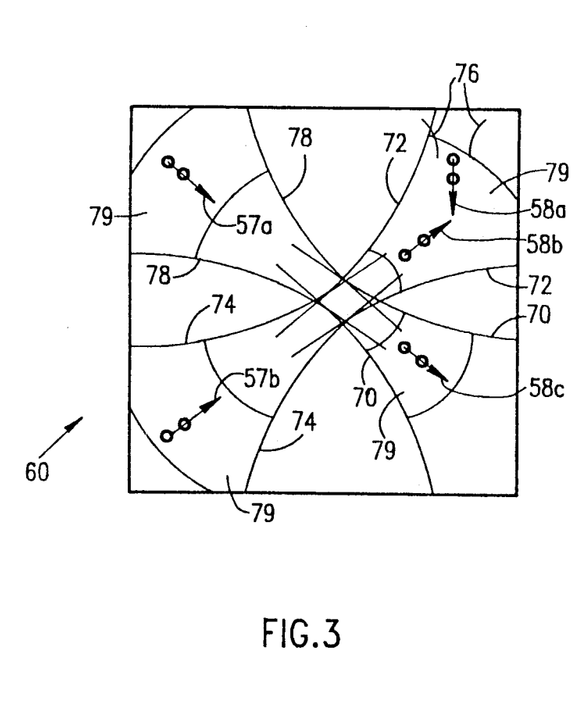
FIG. 3 is an illustration of the superposition of the two composite images of FIGS. 2A and 2B.

From velocity vectors 57a and 57b and from known errors in defining detections 51 and 53, forward error extrapolation curves 70 and 72 can be defined, according to standard MTT techniques, defining the areas within scanning area 30 within which the moving objects which produced velocity vectors 57a and 57b, respectively, can reasonably be expected to have moved during the time between the two consecutive staring times which produced composite images 54 and 56. Similarly, backward error extrapolation curves 74, 76 and 78 can be defined from velocity vectors 58a, 58b and 58c and known errors in defining detections 51 and 55. Curves 74, 76 and 78 define the areas from which the moving objects which produced velocity vectors 58 came.

Additionally, gates 79 can be calculated which more precisely define the areas within the error extrapolation curves 70–78 within which the velocity vectors 57 or 58 are expected to be found.

First and second velocity vectors are produced by the same moving object if the first is within the gate of the second's forward extrapolation curve and the second is within the gate of the first's backward extrapolation curve. Thus, from FIG. 3 it can be seen that velocity vectors 57a and 58c are traced by the same object, as are velocity vectors 57b and 58a.

Figure 4:
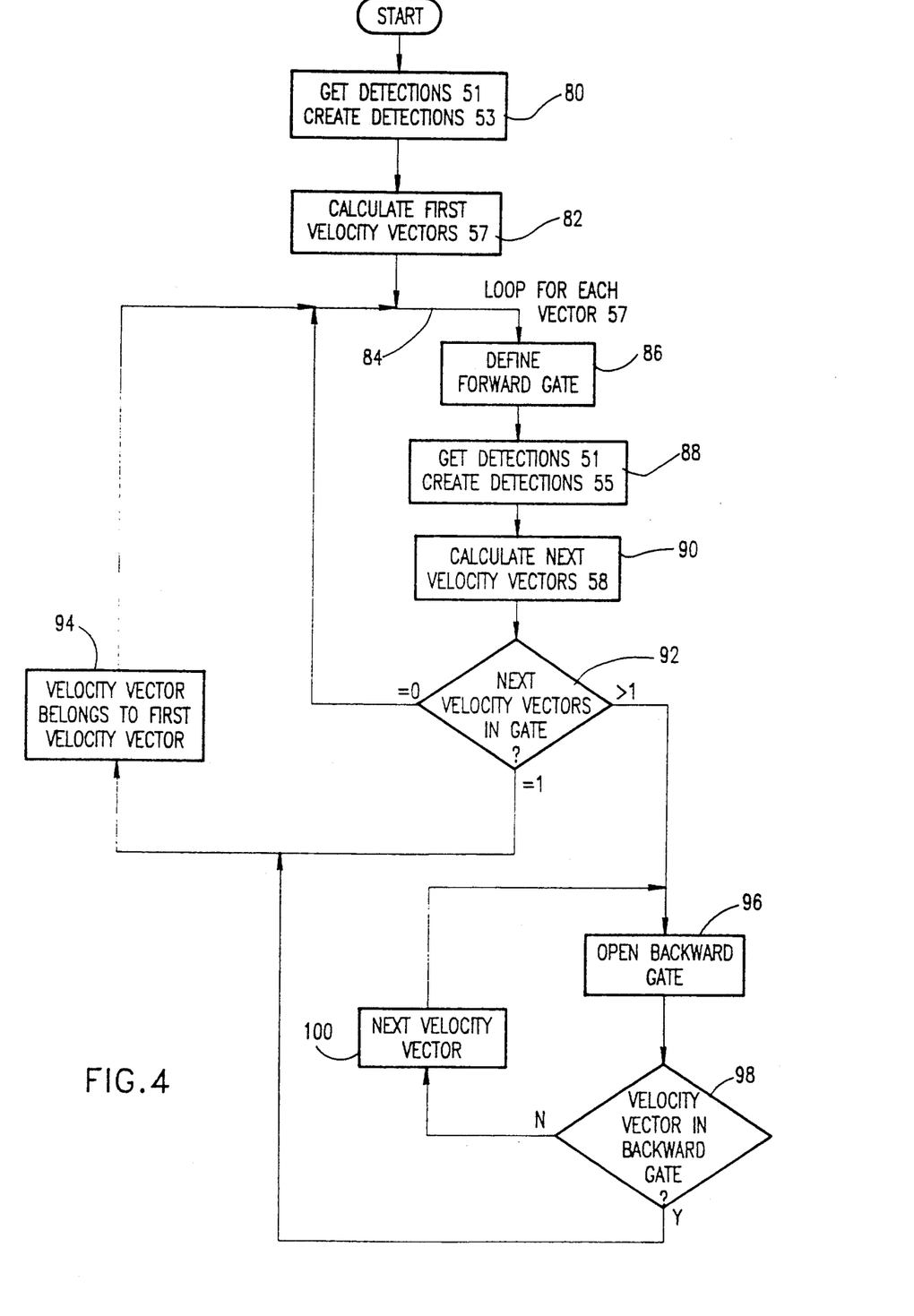
FIG. 4 is a flow chart illustration of a method of error extrapolation operative in accordance with the present invention.

Reference is now made to FIG. 4 which illustrates a flow chart of the error extrapolation method for matching the velocity vectors 57 and 58 to each other as described hereinabove. The method begins, in step 80, with the calculation of a plurality of detections 51 from two consecutive measurements 50. Standard techniques, as discussed hereinabove, are utilized to define detections from a single moving object, such as detections 53 of FIG. 2A. If more than two measurements 50 are available, all of them are utilized to create detections 53. The false detection data is removed at this point.

In step 82, the velocity vectors 57 are calculated from the detections 53 of step 80 as follows:

$$v_a = (r_{2a} - r_{1a})/(t_2 - t_1) \qquad (1)$$

where $v_a$ is a velocity vector, $r_{1a}$ and $r_{2a}$ are position vectors for the two detections 53 and $t_1$ and $t_2$ are the starting times for the measurements 50. Similar calculations are made for the other velocity vectors. For systems employing more than two measurements, equation 1 can be modified to produce a suitable average velocity vector 57.

In step 84, a loop is begun for the entirety of velocity vectors 57 produced in step 82.

In step 86 a forward gate 79 is defined in accordance with standard MTT techniques and utilizing the velocity vectors 57 as well as any known measurement error. As is known in the art, a priori object acceleration information can also be used to define gate 79.

Figure 5:
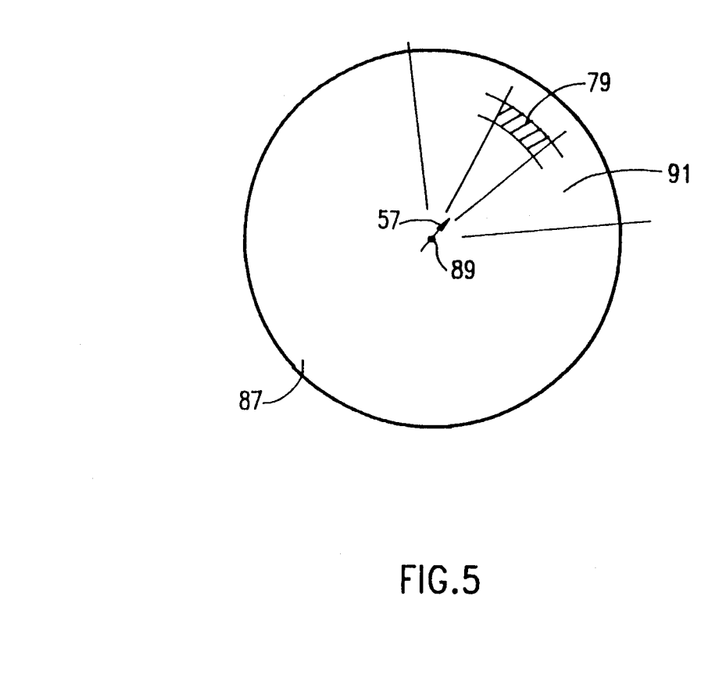
FIG. 5 is an illustration useful in understanding the calculations of the flow chart of FIG. 4.

Reference is briefly made to FIG. 5 which compares the forward gate 79 of the present invention with forward gates of the prior art. The prior art, working from a point 89 and having no directional information, defines a 360° circle 87 within which the next detection is expected to be found. Alternatively, if the prior art has some a priori information, a section 91 of the circle is defined to be the gate. The present invention, on the other hand, uses velocity vector 57 to define its gate 79. Since the velocity vector contains directional and speed information, the area of gate 79 is much smaller and much more accurate than either of the prior art gates.

It will be appreciated that the present invention typically has a longer revisit time than in the prior art. This is not a problem since the use of two-dimensional velocity vectors rather than one-dimensional positions enables a more accurate prediction of the location of the moving object in the next staring time, even though the revisit time between starting times is long.

Reference is now made back to FIG. 4. In step 88 measurements 52 are received. No calculations are performed until at least two measurements 52 are available. This is in contrast to prior art MTT systems which perform calculations on each measurement as it is received. Once two measurements have been received standard techniques are utilized to define detections from a single moving object, such as detections 55 of FIG. 2B.

In step 90, the velocity vectors 58 are calculated from the detections 55 of step 88 in accordance with equation 1.

In step 92 a check is made of the number of velocity vectors 58, calculated in step 90, which are found within the forward gate 79 calculated in step 86. If only one velocity vector 58 is found, as in the case of velocity vector 58c with respect to velocity vector 57c (FIG. 3), then the velocity vector 58 is matched, in step 94, to the present velocity vector 57 and the calculations of loop 84 are repeated for the next velocity vector 57.

If no velocity vectors 58 were found in the gate 79, then the present velocity vector 57 is defined as a false velocity vector and the calculations of loop 84 are repeated for the next velocity vector 57.

If there are more than one velocity vectors 58 in forward gate 79, then a backward gate 79 is opened, in step 96, for one of the velocity vectors in gate 79. If, in step 98, the present velocity vector 57 is found in the backward gate 79, then the method proceeds to step 94. Otherwise, another velocity vector 58 found in forward gate 79 is chosen, in step 100, and steps 96 and 98 are repeated until either a match is made or no more velocity vectors 58 remain.

Once all of the velocity vectors 57 are matched with their respective velocity vectors 58, the method repeats using velocity vectors 58 as the initial vectors.

It will be appreciated that when a number of measurements 50 and 52 are utilized, it is possible to calculate velocity vectors 57 and 58 even if some of the detections 51 are missing. For example, assume that five measurements 50 and 52 are produced. If the moving object was not detected during one of the measurements, the velocity vector can still be calculated from the remaining four measurements and the accuracy of the gate is not impaired. This is a more robust method than prior art MTT systems whose accuracy is impaired when a detection is unavailable.

Figure 6:
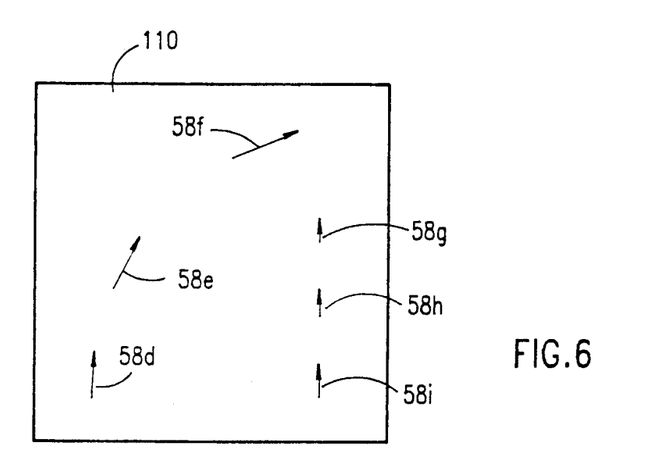
FIG. 6 is an illustration of measurements from three consecutive time periods useful in understanding calculations of the acceleration of the moving object.

Reference is now made to FIG. 6 which illustrates a scanning area 110 with information from there consecutive staring times. Shown are six velocity vectors 58d–58i. Assuming that it has been determined, according to the method of FIG. 4, that vectors 58d–58f belong to one moving object $O_1$ and that vectors 58g–58i belong to another moving object $O_2$, the present invention is operative to calculate the accelerations of the two objects. As can be seen in FIG. 6, object $O_1$ is accelerating in a rotational direction and object $O_2$ is decelerating in a translational direction.

The time of each velocity vector 58 is defined as the average time of the detections 51 which produced it. The acceleration of an object is then calculated as the difference between two consecutive velocity vectors divided by the difference of their respective times.

It will be appreciated that the acceleration calculations require two or more velocity vectors 58 per object.

As mentioned hereinabove, the present invention can be used with FLIR sensor systems. In accordance with a preferred embodiment of the present invention, the FLIR systems are ones which have internal scanning at a high rate such that a two-dimensional area can be scanned within a short space of time. In such systems, the time at which a measurement occurred is the average time required to scan the area.

It will be appreciated by persons skilled in the art that the present invention is not limited to what has been particularly shown and described hereinabove. Rather, the scope of the present invention is defined only by the claims that follow:

We claim:

1. A method of scanning a scene for the purpose of classifying a plurality of moving objects located in the scene and having an average distance between them, the method comprising the steps of:
   performing a sweep of said scene in steps defining portions of said scene;
   during each step, producing a multiplicity of images of at least one portion of said scene at a rate such that a distance traveled by said moving objects between images is small with respect to said average distance; and
   calculating, from the difference between said multiple images, two-dimensional motion information for at least some of said moving objects.

2. A method according to claim 1 and wherein said step of calculating includes the step of producing a velocity vector generally for each moving object.

3. A method according to claim 2 and wherein said steps of performing, producing and calculating are repeated a plurality of times and also including the step of predicting from first velocity vectors of a first sweep the expected locations of second velocity vectors of a second sweep consecutive with said first sweep.

4. A method according to claim 3 and including the step of matching said first velocity vectors of said first sweep to said second velocity vectors of said second sweep.

5. A method according to claim 4 and wherein said step of matching includes the step of producing forward gates corresponding to said first velocity vectors.

6. A method according to claim 4 and wherein said step of matching includes the step of producing backward gates corresponding to said second velocity vectors.

7. A method according to claim 5 and wherein said step of matching includes the step of defining a match if a second velocity vector is in a forward gate of a first velocity vector and said first velocity vector is in a backward gate of said second velocity vector.

8. A method according to claim 6 and wherein said step of matching includes the step of defining a match if a second velocity vector is in a forward gate of a first velocity vector and said first velocity vector is in a backward gate of said second velocity vector.

9. A method according to claim 4 and wherein said step of matching is performed after said step of producing a velocity vector is performed.

10. A system for scanning a scene for the purpose of classifying a plurality of moving objects located in the scene and having an average distance between them, the system comprising:
   a sensor system for scanning a portion of said scene;
   a motor for sweeping said sensor system through said scene in steps defining portions of said scene;
   a sensor controller for producing a multiplicity of images of at least one portion of said scene at a rate such that a distance traveled by said moving objects between images is small with respect to said average distance; and a processor for producing, from the difference between said multiple images, two-dimensional motion information for at least some of said moving objects.

11. A system according to claim 10 and wherein said sensor controller first indicates to said sensor system to scan a first portion of said scene a multiplicity of times and later moves said sensor system to aim towards a second different portion of said scene.

12. A system according to claim 10 and wherein said sensor system is one of the following group: night vision systems, vidicon cameras or CCD cameras.

13. A system according to claim 10 and wherein said sensor system is a FLIR system.

14. A system according to claim 13 and wherein said FLIR system includes means for internal scanning.

15. A system according to claim 10 and wherein said sensor system is a positional sound detector.

* * * * *